(12) United States Patent
Kim

(10) Patent No.: US 8,749,354 B2
(45) Date of Patent: *Jun. 10, 2014

(54) RFID SYSTEM AND METHOD FOR REMOVING TRANSMISSION LEAKAGE SIGNAL THEREOF

(75) Inventor: Yeong Chan Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 273 days.

This patent is subject to a terminal disclaimer.

(21) Appl. No.: 13/103,923

(22) Filed: May 9, 2011

(65) Prior Publication Data

US 2011/0279234 A1 Nov. 17, 2011

(30) Foreign Application Priority Data

May 17, 2010 (KR) .................. 10-2010-0046169

(51) Int. Cl.
*H04Q 5/22* (2006.01)
*G08B 13/14* (2006.01)
*H04B 1/00* (2006.01)
*H04B 1/06* (2006.01)
*H04B 1/16* (2006.01)
*H04B 1/18* (2006.01)

(52) U.S. Cl.
USPC ...... 340/10.3; 340/10.1; 340/572.1; 455/63.1; 455/277.2; 455/284; 455/334

(58) Field of Classification Search
USPC .................. 455/10.1–10.4, 63.1, 78–86, 214, 455/277.2, 284, 334–340
See application file for complete search history.

(56) References Cited

U.S. PATENT DOCUMENTS 5,995,019 A * 11/1999 Chieu et al. .............. 340/10.32
8,410,905 B2 * 4/2013 Song et al. .................. 340/10.1
(Continued)

FOREIGN PATENT DOCUMENTS

CN 101647205 2/2010
JP 08-122429 5/1996
(Continued)

OTHER PUBLICATIONS

Korean Intellectual Property Office Application Serial No. 10-2010-0046169, Office Action dated Sep. 30, 2013, 5 pages.

(Continued)

*Primary Examiner* — Benjamin C Lee
*Assistant Examiner* — Adam Carlson
(74) *Attorney, Agent, or Firm* — Lee, Hong, Degerman, Kang & Waimey

(57) ABSTRACT

Disclosed is an RFID system that includes a controller that outputs the transmission signal to be transmitted to an RFID tag and reads a receiving signal transmitted from the RFID tag; a leakage signal canceller that receives a portion of the transmission signal and the receiving signal, and performs an adjustment task to generate a cancellation signal according to an adjustment value and the portion of the transmission signal to remove a transmission leakage signal and to remove the transmission leakage signal included in the receiving signal; and a reader controller that determines whether there is a change of an RF environment using an intensity of the receiving signal according in a period set in advance, controls an operation of the leakage signal canceller according to the change of the RF environment, and controls an operation of the controller to read the receiving signal transmitted from the RFID tag.

6 Claims, 3 Drawing Sheets

(56) References Cited

U.S. PATENT DOCUMENTS

| | | | |
|---|---|---|---|
| 2006/0049250 A1* | 3/2006 | Sullivan | 235/385 |
| 2006/0198429 A1 | 9/2006 | Huang et al. | |
| 2006/0252398 A1* | 11/2006 | Park et al. | 455/296 |
| 2007/0072567 A1* | 3/2007 | Nagai et al. | 455/205 |
| 2008/0079547 A1* | 4/2008 | Alicot et al. | 340/10.3 |
| 2008/0224829 A1 | 9/2008 | Kuramoto | |
| 2009/0068957 A1* | 3/2009 | Koo et al. | 455/67.14 |
| 2009/0232260 A1 | 9/2009 | Hayashi et al. | |
| 2011/0285508 A1* | 11/2011 | Kim | 340/10.1 |

FOREIGN PATENT DOCUMENTS

| | | |
|---|---|---|
| JP | 09-186626 | 7/1997 |
| JP | 10-062518 | 3/1998 |
| JP | 11-308143 | 11/1999 |
| JP | 2000-134131 | 5/2000 |
| JP | 2007-189338 | 7/2007 |
| JP | 2008-147934 | 6/2008 |
| JP | 2010-505190 | 2/2010 |
| JP | 2010-102530 | 5/2010 |
| KR | 20080096176 | 10/2008 |
| KR | 10-2009-0047873 | 5/2009 |

OTHER PUBLICATIONS

The State Intellectual Property Office of the People's Republic of China Application Serial No. 201110130416.1, Office Action dated Jun. 13, 2013, 13 pages.

* cited by examiner

RFID SYSTEM AND METHOD FOR REMOVING TRANSMISSION LEAKAGE SIGNAL THEREOF

Pursuant to 35 U.S.C. §119 (a), this application claims the benefit of earlier filing date and right of priority to Korean Patent Application No. 10-2010-0046169, filed on May 17, 2010, the contents of which are hereby incorporated by reference in their entirety.

BACKGROUND OF THE DISCLOSURE

1. Field of the Invention

The present disclosure relates to a Radio Frequency Identification (referred to as 'RFID', hereinafter) system capable of removing a transmission leakage signal.

2. Description of the Related Art

Generally, an RFID system is widely used in a system for transmitting and receiving information in a variety of fields such as approval management, document management, distribution management, identification and radio authentication, which includes a plurality of tags on which tag information is recorded and a reader to read tag information included in the tag.

The plurality of tags in the same radio frequency field in such an RFID system are activated by the reader and, the tags transmit their own tag information to the reader causing a collision in the plurality of tag information.

Accordingly, in order to solve the above described problem, the reader periodically transmits an anti-collision period that is a time when each tag can send the tag information, so as to prevent the plurality of tag information from colliding among them.

Meanwhile, in order to isolate a transmission signal from a receiving signal in an RFID system in which a radio signal is transmitted and received together, a separate isolation device such as an isolator is used.

Since there occurs a phenomenon in which the reader cannot receive a receiving signal well due to the fact that a portion of a transmission signal is leaked and mixed into the receiving signal while the transmission signal is transmitted and a receiving signal is received, the reader includes a separate leakage canceller to cancel such a transmission leakage signal, so that it performs an adjustment task to generate a cancellation signal.

However, while a set condition of the leakage signal canceller should be changed to cancel the transmission leakage signal that changes according to an RF environment when an RF environment having tags installed therein changes, a reader controller to control a reader in the RFID system in the art is engaged only in a task to read the tag during an anti-collision period so that there occurs a problem that the set condition cannot be changed according to a change of the RF environment.

Further, once a set condition is set in a leakage signal canceller, since the set condition is constantly remained until the anti-collision period finishes, there was a limitation to suitably counteract a market requirement according to a change of RF environment.

SUMMARY OF THE INVENTION

The present disclosure provides an RFID system that can continuously remove a transmission leakage signal by performing a function to read an RF tag in a controller and removing a transmission leakage signal in a reader controller at a time when the RF tag is read in the art.

Further, the present disclosure provides an RFID system that can remove a transmission leakage signal by readjusting a leakage signal canceller according to a change of an RF environment even in an anti-collision period.

According to an aspect of the present disclosure, an RFID system that includes an antenna to send a transmission signal to an RFID tag and receives a receiving signal transmitted from the RFID tag, and an isolator to isolate the transmission signal and the receiving signal therebetween, the system comprising: a controller that outputs the transmission signal to be transmitted to the RFID tag and reads a receiving signal transmitted from the RFID tag; a leakage signal canceller that receives a portion of the transmission signal and the receiving signal, and performs an adjustment task to generate a cancellation signal according to an adjustment value and the portion of the transmission signal to remove a transmission leakage signal and to remove the transmission leakage signal included in the receiving signal; and a reader controller that determines whether there is a change of an RF environment using an intensity of the receiving signal according in a period set in advance, the RFID tag being installed in the RF environment, controls an operation of the leakage signal canceller according to the change of the RF environment, and controls an operation of the controller to read the receiving signal transmitted from the RFID tag.

Preferably, the controller output a transmission signal to be transmitted to the RFID tag when a transmission command signal is transmitted from the reader controller, read the receiving signal transmitted from the RFID tag and transmit the read tag information to the reader controller.

Preferably, the reader controller may compare the intensity of the receiving signal with a reference value in a period set in advance, and determine that there is a change in the RF environment when the intensity of the receiving signal is equal to or greater than a reference value.

Preferably, the reader controller may detect an adjustment value that makes the intensity of the receiving signal less than a reference value and transmit the adjustment value to the leakage signal canceller when it is determined that there is a change in the RF environment, and the leakage signal canceller may generate a cancellation signal according to the adjustment value and remove the transmission leakage signal included in the receiving signal.

Preferably, the cancellation signal may have the same amplitude and the opposite phase as the transmission leakage signal.

Preferably, the reader controller may determine whether the RF environment is changed using the intensity of the receiving signal even in the anti-collision period, the RFID tag being installed in the RF environment, and detect the adjustment value according to the change of the RF environment and control the leakage signal canceller to generate the cancellation signal when the RF environment is changed.

Preferably, the leakage signal canceller may include a first leakage signal canceller that performs an adjustment task to generate a cancellation signal according to the adjustment value and cancel the transmission leakage signal included in the receiving signal; and a second leakage signal canceller that outputs the receiving signal to the reader controller, after the adjustment task to generate the cancellation signal according to the adjustment value and cancel the transmission leakage signal included in the receiving signal.

Preferably, the reader controller may determine whether the intensity of the receiving signal transferred from the second leakage signal canceller is equal to or greater than a reference value, redetect the adjustment value and applies the adjustment value to the second leakage signal canceller, when the intensity of the receiving signal is equal to or greater than the reference signal; repeatedly perform the determination and application processes until the intensity of the receiving signal becomes less than the reference value; and when the intensity of the receiving signal becomes less than the reference signal, apply an adjustment value corresponding to the intensity of the receiving signal to the first leakage signal canceller.

According to another aspect of the present disclosure, a method for removing a transmission leakage signal of an RFID system that includes an antenna to send a transmission signal to an RFID tag and receives a receiving signal transmitted from the RFID tag, and an isolator to isolate the transmission signal and the receiving signal therebetween, the method comprising: (a) determining a change of an RF environment using an intensity of a receiving signal transmitted from the RFID tag in a period set in advance; and (b) detecting an adjustment value to remove a transmission leakage signal and removing the transmission leakage signal included in the receiving signal when there is a change of the RF environment is changed as a result of the determination of step (a).

Preferably, step (a) may include (e) comparing the intensity of the receiving signal with a reference value in a period set in advance; and (f) determining that there is the change of the RF environment when the intensity of the receiving signal is equal to or greater than the reference value as a result of comparison of step (e).

Preferably, step (b) may include (i) detecting an adjustment value to remove a transmission leakage signal, when the RF environment was changed, as a result of the determination of step (a); and (j) generating a cancellation signal according to the adjustment value and removing the transmission leakage signal included in the receiving signal.

Preferably, step (i) may include detecting the adjustment value used to make the intensity of the receiving signal less than a reference value.

Preferably, step (b) may include (m) detecting an adjustment value to remove the transmission leakage signal, when there is a change of the RF environment as a result of determination of step (a); (n) enabling a second leakage signal canceller to generate a cancellation signal according to the adjustment value detected at step (m) and remove the transmission leakage signal included in the receiving signal; (o) performing steps (m) and (n) repeatedly until the intensity of the receiving signal becomes less than the reference value; and (p) enabling a first leakage signal canceller to generate the cancellation signal according to the adjustment value corresponding to the intensity of the receiving signal and remove the transmission leakage signal included in the receiving signal when the intensity of the receiving signal is less than the reference value as a result of repetitively performing step (o).

The RFID system according to the present disclosure has and advantageous effect in that a transmission leakage signal included in the receiving signal is removed more effectively when a transmission and a reception are performed together in an RFID system so that a receive sensitivity can be enhanced and a tag reading can be performed more precisely.

The RFID system according to the present disclosure has another advantageous effect in that a reader controller controls a controller so that a function to read an RFID tag is performed, and a transmission leakage signal can be continuously removed by directly controlling a leakage signal canceller at a time (surplus time) when an RFID tag in the art is read.

The RFID system according to the present disclosure has still another advantageous effect in that a transmission leakage signal can be efficiently removed by readjusting a leakage signal canceller according to a change of an RF environment even in an anti-collision period in the RFID system.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Hereinafter, a preferred embodiment of the present disclosure will be described with reference to the accompanying drawings. Further, when it is determined that a detailed explanation of known function or construction related when describing the present disclosure unnecessarily obscures the gist of the present disclosure, its detailed description will be omitted.

Figure 1:
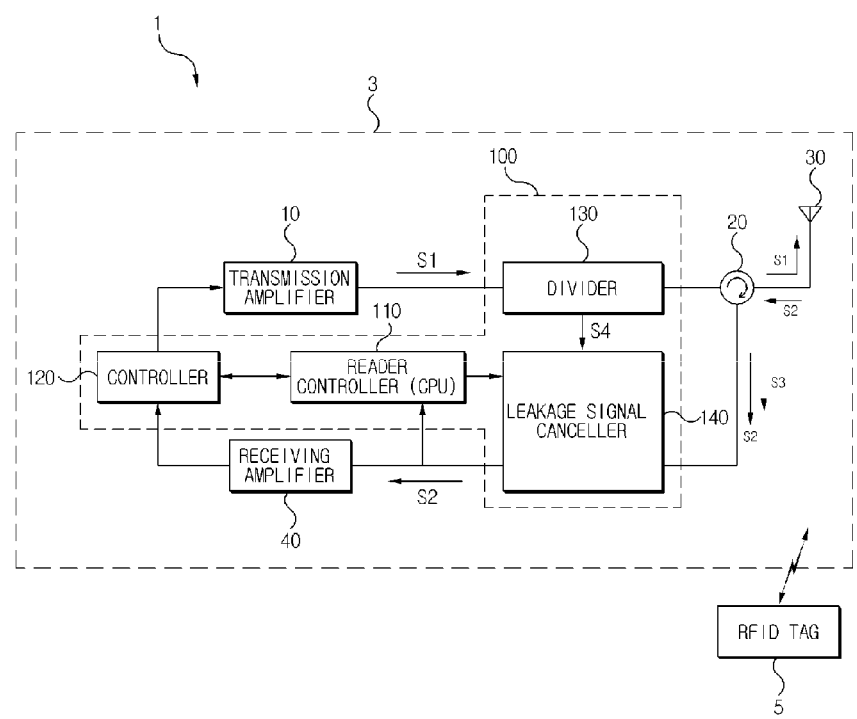
FIG. 1 is a block diagram illustrating a construction of an RFID system according to an embodiment of the present disclosure.

FIG. 1 is a block diagram illustrating a construction of an RFID system according to an embodiment of the present disclosure.

Referring to FIG. 1, a transmission leakage signal removing apparatus 100 of the RFID system 1 is constructed of a reader controller 110, a controller 120, a divider 130 and a leakage signal canceller 140.

The RFID system 1 is generally constructed of an RFID reader 3 and an RFID tag 5. The RFID reader 3 includes the transmission leakage signal removing apparatus 100, which identifies tag information stored in the RFID tag 5 by transmitting and receiving RF signal to and from the RFID tag 5.

To this end, the RFID reader 3 outputs a transmission signal S1 so as to send it to the RFID tag 5, and receives a receiving signal S2 sent from the RFID tag 5 so as to read tag information of the RFID tag 5. The reader controller (CPU) 110 is a microcomputer that generally controls the RFID reader 3, controlling an operation of the controller 120 that reads tag information of the RFID tag 5 and an operation of the leakage signal canceller 140 that performs an adjustment task to remove the transmission leakage signal.

More concretely, when a transmission command signal is transmitted from the reader controller 110 to the controller 120, the controller 120 receives the transmission command signal, and outputs a transmission signal S1 to be sent to the RFID tag 5 according to the transmission command signal.

Such a transmission signal S1 is amplified by a transmission amplifier 10 and radiated through an antenna 30 by way of the divider 130 and an isolator 20.

Further, the reader controller 110 receives the tag information of the RFID tag 5 read from the controller 120 and controls the RFID reader 3 according to the received tag information of the RFID tag 5.

Further, in order to prevent a collision from occurring among a plurality of tag information (that is, a plurality of receiving signals S2 sent from the plurality of RFID tags 5), the reader controller 110 periodically sets an anti-collision period that is a time when each RFID tag 5 can send its receiving signal S2.

By doing so, each RFID tag 5 sends the receiving signal S2 at the anti-collision period.

The controller 120 outputs the transmission signal S1 to be sent to the RFID tag 5 under the control of the reader controller 110, receives the receiving signal S2 through the antenna 30 so as to read the tag information of the RFID tag 5, and transmits the read tag information of the RFID tag 5 to the reader controller 110.

At this time, the receiving signal S2 received through the antenna 30 is transferred to the receiving amplifier 40 by the isolator 20, and the receiving amplifier 40 amplifies the receiving signal S2 and transmits it to the controller 120.

Meanwhile, while the transmission signal S1 is transmitted and the receiving signal S2 is received, there occurs a phenomenon in which a portion of the transmission signal S1 is leaked and a transmission leakage signal S3 is mixed into the receiving signal S2.

As such, in order to cancel the transmission leakage signal S3 mixed into the receiving signal S2, the divider 130 outputs a divided signal S4 made by dividing a portion of the transmission signal S1, to the leakage signal canceller 140.

Meanwhile, the leakage signal canceller 140 receives the divided signal S4 that is output from the divider 130 and the receiving signal S2, and generates a cancellation signal and couples it with the receiving signal S2 (into which the transmission leakage signal S3 is mixed) to cancel the transmission leakage signal S3 included in the receiving signal S2 under the control of the reader controller 110.

As such, the transmission leakage signal S3 included in the receiving signal S2 is cancelled by a cancellation signal so that only a pure receiving signal S2 is transferred to the receiving amplifier 40.

Here, the leakage signal canceller 140 generates a cancellation signal on the basis of the divided signal S4 that is divided from the transmission signal S1. At this time, the cancellation signal has the same amplitude and the opposite phase as the transmission leakage signal S3.

In more detail, in the state that an adjustment condition to remove the transmission leakage signal S3 was set in the leakage signal canceller 140 in advance, the leakage signal canceller 140 receives the divided signal S4 and receiving signal S2. When an adjustment value is transferred from the reader controller 110, the leakage signal canceller 140 resets an adjustment condition according to the transferred adjustment value, generates a cancellation signal according to the reset adjustment condition, and performs an adjustment task to remove the transmission leakage signal S3.

To this end, the reader controller 110 performs an operation to search and detect an adjustment value among a plurality of adjustment values to prevent the transmission signal S1 from being mixed into the receiving signal S2 as much as possible.

Here, the adjustment value is a value that is set in the leakage signal canceller 140 to remove the transmission leakage signal S3 mixed into the receiving signal S2, which can make the intensity of the receiving signal minimum in order to prevent the transmission signal S1 from being mixed into the receiving signal S2 as much as possible (that is, in order that the transmission signal S1 affects the receiving signal S2 to the minimum).

Hereinafter, an operation to control the leakage signal canceller 140 in the reader controller 110 in order to remove the transmission leakage signal according to a change of an RF environment will be described.

The reader controller 110 receives the receiving signal S2 from the RFID tag 5 in the RF environment, and confirms whether there is a change of the RF environment for the RFID tag 5 using the intensity of the receiving signal S2.

Here, the change of the RF environment means that the number of the RFID tag 5 or the position of the RFID tag 5 are changed.

Further, when there is a change of the RF environment, the reader controller 110 redetects an adjustment value to remove the transmission leakage signal S3 according to the change of the RF environment and resets an adjustment condition by applying the redetected adjustment value to the leakage signal canceller 140, so that the reader controller 110 controls to perform the adjustment task to generate the cancellation signal again.

Meanwhile, the reader controller 110 detects an adjustment value using a method to find that the intensity of the receiving signal S2, that is, the amount of the receiving signal S2 is the minimum value, that is, zero (0) value.

More concretely, since the receiving signal S2 input into reader controller 110 is in a state that the transmission leakage signal S3 was already removed by way of the leakage signal canceller 140, the intensity of the receiving signal S2 should be approximated to the minimum value of zero (0) value. However, since the intensity of the receiving signal S2 becomes large (that is, the intensity of the receiving signal becomes equal to or greater than a reference value) even though it passes through the leakage signal canceller 140 when the RF environment is changed, the reader controller 110 should perform an adjustment task as the RF environment changes.

Accordingly, the reader controller 110 redetects an adjustment value to make the intensity of the receiving signal S2 minimum, and changes the adjustment condition by applying the redetected adjustment value to the leakage signal canceller 140, so that the intensity of the receiving signal S2 has the minimum value (that is, the intensity of the receiving signal is less than a reference signal) even when the RF environment changes.

Here, the redetected adjustment value refers to a value that is detected as a result of searching the adjustment value among the plurality of adjustment values that were already stored in the reader controller 110 in order that the intensity of the receiving signal becomes the minimum value.

In order to detect the adjustment value, the intensity of the receiving signal should be always checked when the RFID reader 3 operates.

Meanwhile, the reader controller 110 enables the leakage signal canceller 140 to perform an adjustment task when the RF environment changes even in an anti-collision period.

As described above, the reader controller 110 controls the controller 120 to perform a reading function of the RFID tag, and directly controls the leakage signal canceller 140 for a surplus time caused by performing the reading function so that a continuous operation to remove the transmission leakage signal is embodied.

Figure 2:
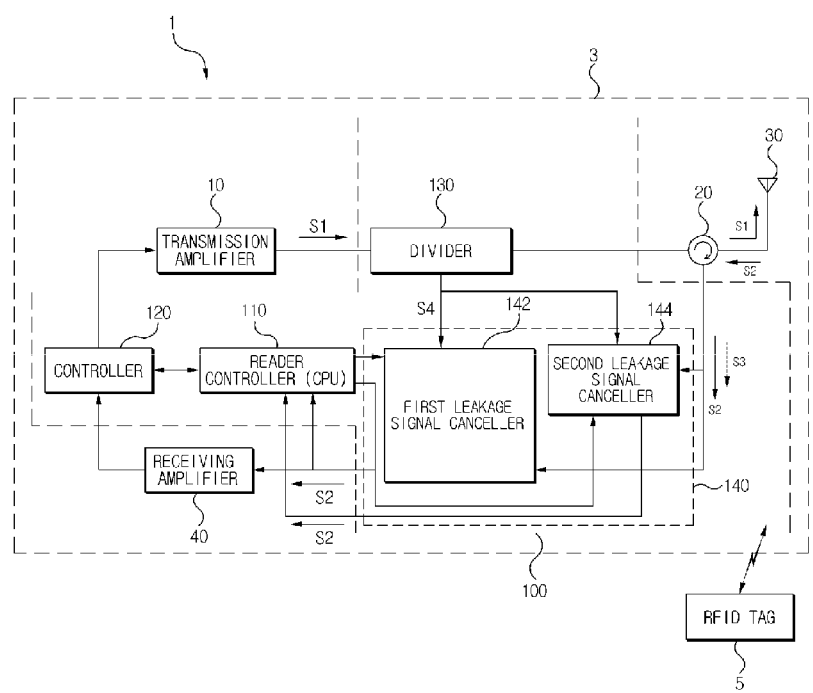
FIG. 2 is a block diagram illustrating a construction of an RFID system according to another embodiment of the present disclosure.

FIG. 2 is a block diagram illustrating a construction of an RFID system according to another embodiment of the present disclosure.

Referring to FIG. 2, the transmission leakage signal removing apparatus 100 of the RFID system 1 is constructed of a reader controller 110, a controller 120, a divider 130, a first leakage signal canceller 142 and a second leakage signal canceller 144.

Hereinafter, since a construction having the same function was described in the first embodiment, it will be omitted.

The first leakage signal canceller 142 receives a divided signal S4 and a receiving signal S2 in the state that an adjustment condition was set in advance, resets an adjustment condition according to an adjustment value transferred from the reader controller 110, and generates a cancellation signal according to the reset adjustment condition, so that the first leakage signal canceller 142 again performs an adjustment task to remove the transmission leakage signal S3.

The second leakage signal canceller 144 sets the adjustment condition by applying the adjusted value transferred from the reader controller 110, generates a cancellation signal to cancel the transmission leakage signal S3 included in the receiving signal S2 according to the adjustment condition set in advance, performs an adjustment task to remove the transmission leakage signal S3 using a cancellation signal, and outputs the receiving signal S2 from which the transmission leakage signal S3 was removed, to the reader controller 110.

The reader controller 110 determines whether an adjustment task to cancel the transmission leakage signal S3 was suitably performed using the receiving signal S2 output from the second leakage signal canceller 144 (that is, determines whether the intensity of the receiving signal S2 is the minimum value), and enables the first leakage signal canceller 142 to perform an adjustment task to remove the transmission signal S3 by applying the adjustment value to the first leakage signal canceller 142 when the adjustment task was suitably performed.

However, when the adjustment task to cancel the transmission leakage signal S3 was not suitably performed, the reader controller 110 redetects the adjustment value so as to apply it to the second leakage signal canceller 144, and the second leakage signal canceller 144 repeatedly performs processes to perform the adjustment task again using the redetected adjustment value and output the receiving signal S2 that is a result of performing the adjustment task to the reader controller 110, so that a task to detect the optimum adjustment value is performed.

As such, the second leakage signal canceller 144 is used to detect an adjustment value to make the intensity of the receiving signal S2 minimum, and it is possible to reduce time to detect the adjustment value and operate compared with when one leakage signal canceller 140 is used.

Further, the reader controller 110 performs a readjustment task of the leakage signal canceller 140 when there is a change of an RF environment even in an anti-collision period.

Figure 3:
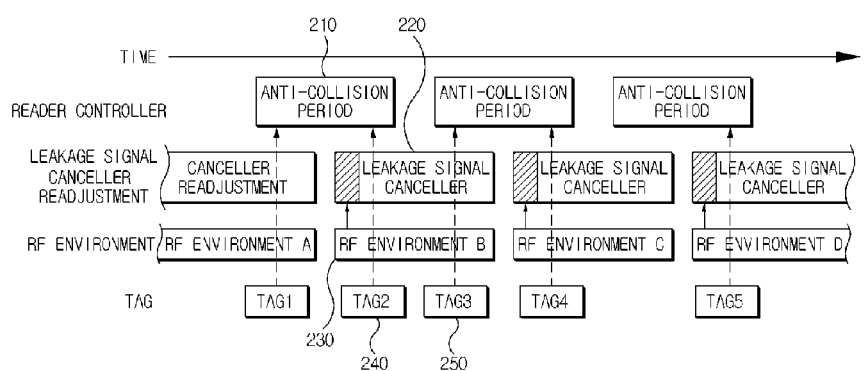
FIG. 3 is a time chart explaining a transmission leakage signal removal in an RFID system according to an embodiment of the present disclosure.

FIG. 3 is a time chart explaining a transmission leakage signal removal in an RFID system according to an embodiment of the present disclosure.

Referring to FIG. 3, in the RFID system according to the present disclosure, the reader controller 110 sets an anti-collision period 210 according to a period set in advance and transmits the set anti-collision period 210 to each RFID tag 5 through the controller 120.

Each RFID tag 5 transmits the receiving signal S2 to the RFID reader 3 within the each anti-collision period set as described above so that a number of receiving signals S2 are prevented from colliding among them.

At this time, the reader controller 110 continues to confirm whether there is a change of the RF environment to receive the receiving signal from the plurality of RFID tag 5 even in each anti-collision period.

This is to detect an adjustment value according to the change of the RF environment when there is a change of the RF environment and perform a readjustment task 220 in the leakage signal canceller 140.

Here, the readjustment task of the leakage signal canceller 140 is a task to cancel the transmission leakage signal S3 included in the tag signal that is received in the RFID reader, the task referring to receiving the tag signal from the tag in the changed RF environment, generating a cancellation signal to cancel the transmission leakage signal S3 included in the tag and coupling the cancellation signal with the received tag signal.

By doing such coupling, the transmission leakage signal S3 included in the tag signal is removed and only a pure tag signal is transferred.

At this time, the anti-collision has a period of several milliseconds to tens of seconds, and there may be a case that the reader cannot read the tag signal after the RF environment is changed when there occurs a change of the RF environment without performing a readjustment task in the leakage signal canceller 140 during the anti-collision period.

As such, when an RF environment around the tag is changed even in the same anti-collision period, it is possible to correctly identify the tag information by receiving the tag signal from the tag in the changed RF environment even when the RF environment is changed.

Therefore, it is possible to correctly receive the tag signal from the tag in the changed RF environment by confirming the change of the RF environment according to a period set in advance and continuously performing the readjustment task of the leakage signal canceller 140 according to the change of the RF environment.

While the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. An RFID system comprising:
   an antenna configured to send a transmission signal to an RFID tag in an RF environment and to receive a receiving signal transmitted from the RFID tag;
   an isolator configured to isolate the transmission signal and the receiving signal;
   a reader controller;
   a controller separate from the reader controller and configured to:
     output the transmission signal to be transmitted to the RFID tag when a transmission command signal is received from the reader controller;
     read the receiving signal transmitted from the RFID tag; and
     transmit tag information read from the receiving signal to the reader controller;
   a leakage signal canceller configured to receive the receiving signal including a transmission leakage signal and a portion of the transmission signal, wherein the leakage signal canceller comprises:
     a first leakage signal canceller configured to perform an adjustment task including generating a cancellation signal according to an adjustment value to cancel the transmission leakage signal from the receiving signal; and
     a second leakage signal canceller configured to perform the adjustment task and output the receiving signal without the transmission leakage signal to the reader controller after the adjustment task is performed;
   wherein the reader controller is configured to:

determine whether there is a change in the RF environment using an intensity of the receiving signal directly received from the leakage signal canceller during a preset period;

detect the adjustment value that results in the intensity of the receiving signal being less than a reference value;

transmit the adjustment value to the leakage signal canceller when there is a change in the RF environment;

cause the leakage signal canceller to cancel the transmission leakage signal from the receiving signal according to the change in the RF environment using the adjustment value;

repeatedly determine whether the intensity of the receiving signal output by the second leakage signal canceller is equal to or greater than the reference value, redetect the adjustment value, and cause the second leakage signal canceller to perform the adjustment task with the redetected adjustment value until the intensity of the receiving signal is less than the reference value;

cause the first leakage signal canceller to perform the adjustment task using the redetected adjustment value to generate the receiving signal without the transmission leakage signal, and transmit the receiving signal without the transmission leakage signal to a receiving amplifier; and cause the controller to read the receiving signal without the transmission leakage signal that is transmitted from the receiving amplifier.

2. The RFID system according to claim 1, wherein the reader controller is further configured to:

compare the intensity of the receiving signal output by the second leakage signal canceller with the reference value during the preset period; and determine that there is a change in the RF environment when the intensity of the receiving signal is equal to or greater than the reference value.

3. The RFID system according to claim 1, wherein the cancellation signal has a same amplitude as the transmission leakage signal, but has an opposite phase from the transmission leakage signal.

4. A method for removing a transmission leakage signal in an RFID system that sends a transmission signal to an RFID tag in an RF environment, receives a receiving signal transmitted from the RFID tag, and isolates the transmission signal and the receiving signal, the method comprising:

sending the transmission signal to the RFID tag via a controller when a transmission command signal is transmitted from a reader controller;

receiving the receiving signal from the RFID tag during a preset period via the controller;

determining a change in the RF environment via the reader controller by using an intensity of the receiving signal;

repeatedly detecting an adjustment value and generating a cancellation signal according to the adjustment value by a second leakage signal canceller until the intensity of the receiving signal is less than a reference value;

generating the cancellation signal via a first leakage signal canceller according to the adjustment value that causes the intensity of the receiving signal to be less than the reference value;

removing the transmission leakage signal included in the receiving signal using the generated cancellation signal;

outputting the receiving signal to the reader controller;

reading information from the receiving signal via the controller; and transmitting the information read from the receiving signal to the reader controller.

5. The method according to claim 4, wherein determining the change in the RF environment comprises:

comparing the intensity of the receiving signal with the reference value during a preset period; and determining the change in the RF environment when the intensity of the receiving signal is equal to or greater than the reference value.

6. The method according to claim 4, wherein detecting the adjustment value comprises detecting the adjustment value which results in the intensity of the receiving signal being less than a reference value.

* * * * *